No. 656,399. Patented Aug. 21, 1900.
P. H. FLOWERS.
EYEGLASSES.
(Application filed Feb. 21, 1900.)
(No Model.)
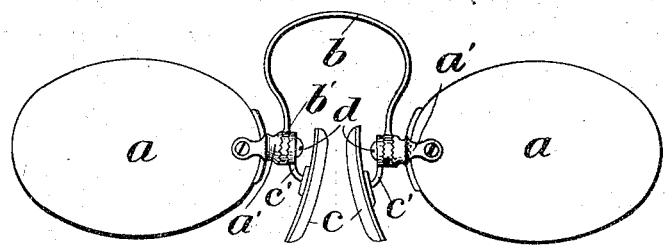
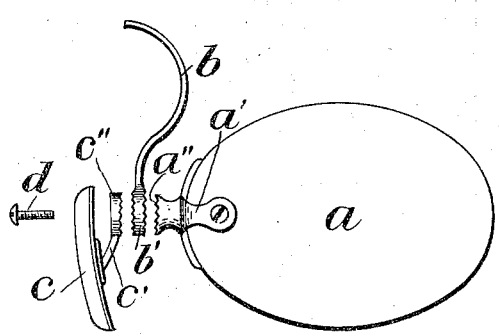
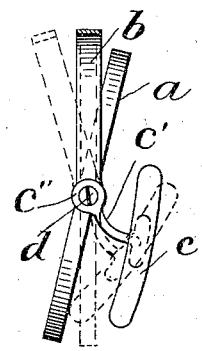
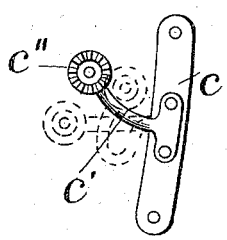
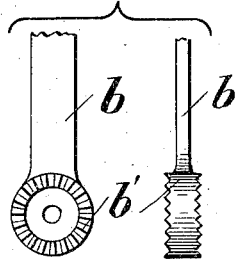
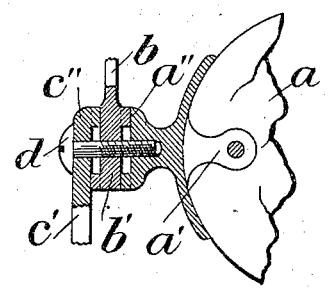
Witnesses
Geo. E. Fuch.
Emily R. Peck.
Inventor
Polk H. Flowers,
per Hubert E. Peck
Attorney

UNITED STATES PATENT OFFICE.

POLK H. FLOWERS, OF CENTREVILLE, TENNESSEE.

EYEGLASSES.

SPECIFICATION forming part of Letters Patent No. 656,399, dated August 21, 1900.

Application filed February 21, 1900. Serial No. 6,051. (No model.)

*To all whom it may concern:*

Be it known that I, POLK H. FLOWERS, a citizen of the United States, residing at Centreville, in the county of Hickman and State of Tennessee, have invented certain new and useful Improvements in Eyeglasses; and I do hereby declare the following to be a full, clear, and exact description of the invention, such as will enable others skilled in the art to which it appertains to make and use the same.

This invention relates to certain improvements in eyeglasses, and more particularly to certain improvements in mountings for eyeglasses; and the objects and nature of my invention will be obvious to those skilled in the art in view of the following description, which refers for purposes of illustration to the construction shown in the accompanying drawings as an example among other devices within the spirit and scope of my invention.

This invention consists in certain novel features in construction and in combinations and arrangements of parts and details, as more fully and particularly pointed out and described hereinafter.

Referring to the accompanying drawings, Figure 1 is a front elevation of a pair of eyeglasses mounted or the frame of which is constructed in accordance with my invention. Fig. 2 is an elevation of one lens, the connecting-spring being partially broken away and the nose-guard, spring, and stud being shown separated, with the clamping pivot-screw removed and shown in elevation. Fig. 3 is an end elevation of the pair of eyeglasses, dotted lines showing the parts adjusted to different relative angles or positions. Figs. 4, 5, and 6 are detail views.

Difficulty is experienced by the optician in properly applying the eyeglasses at present generally found on the market by reason of the impossibility of adjusting the relative angles or positions of the lenses, spring, and nose-guards or the relative angle or position of the lenses and nose-guard independently of and without changing the relative position of the spring. The optician is now generally obliged to carry a large stock of various styles of frames or eyeglass-mounts in order to fill various prescriptions and meet and supply the widely-varying conditions and wants of different patients.

It is an object of my invention to provide a mount or frame for eyeglasses so constructed and arranged that a pair of eyeglasses can be adjusted to fill any prescription and to properly fit the nose of any patient, with the lenses arranged and located properly before the eyes and the spring properly located with respect to the forehead, by providing peculiar means for permitting independent adjustments of the guards, spring, and lenses. By employing my invention the guards can be independently adjusted to any desired position or angle to fit the desired portion of the nose, so that they will properly grip to hold the glasses in place without discomfort to the wearer. The spring can be swung toward or away from the forehead without changing the relative positions of the lenses or nose-guards, for in fitting the ordinary glasses it often happens that when the guards and lenses are properly located with respect to the nose and eyes the spring will press against the forehead; also, the lenses can be independently adjusted to the proper position with respect to the eyes, for in fitting the ordinary glasses it often happens that when the guards and spring are located as desired the lenses will be inclined or otherwise objectionably located with respect to the eyes or line of vision.

In the drawings, $a$ $a$ are the lenses, which can be provided with rims or not, as found most desirable, although in the drawings for the purposes of convenient illustration I show the lenses without surrounding rims or frames and having the studs $a'$ secured to the inner ends or sides of the lenses in any suitable and desirable manner. These studs project inwardly, as usual, and each has a threaded hole tapped longitudinally thereinto, while the outer end of the stud is formed approximately flat or plane to constitute a bearing seat or face, and said bearing seat or face is preferably formed with the series of radiating (or otherwise arranged) notches or serrations (see $a''$) around the said screw-hole.

$b$ is the connecting-spring, which can be of any suitable and desirable form and construction and is provided with the end eyes or centrally-perforated end heads $b'$, the perforations of which register, respectively, with the threaded holes of said studs and the outer flat faces of which fit and bear against the outer ends or bearing-faces of said studs, respectively. The outer and inner flat faces of said heads or eyes $b'$ are preferably notched, toothed, or serrated radially, approximately as shown. The teeth or notches of the outer faces intermesh with the teeth or notches of the ends of the studs, so that said parts can be held and locked against independent turning or rocking, as hereinafter more fully set forth.

$c$ indicates the nose-guards, each preferably, although not necessarily, consisting of an oblong or elongated pad provided with a suitable back, frame, or holder of any suitable and desirable construction.

$c'$ $c'$ are the arms or holders for said pads and forming parts of the nose-guards. Each arm $c'$ consists, preferably, of a flexible metal wire or rod usually circular in cross-section and preferably attached rigidly to the back of a pad about at the center of the length thereof and extending laterally therefrom. The opposite end of each arm $c'$ is formed with a perforated head $c''$, the inner face of which is preferably formed with radial teeth, serrations, or notches to coincide and intermesh with the corresponding notches at the outer face of a spring-eye. The outer face of each eye $c''$ is usually smooth, although my invention is not so limited.

$d$ $d$ are the headed pivot clamping-screws. Each screw passes through a nose-guard eye, a spring-eye, and into a stud, and by tightening the screw its head bearing against the smooth outer face of the nose-guard eye will clamp the said various parts together, with their locking-notches intermeshing, and thus tightly hold and lock the parts together against independent axial movement on said screw. When either or both screws are loosened sufficiently to permit such movement of a guard, lens, or the spring as to free its locking-notches from the notches of adjacent parts, then said part can be freely rocked or turned to the desired angle on the clamping-screw as a pivot. When the parts are thus loosened, the spring can be swung in either direction, the lenses rocked to the desired angle with respect to the spring or guards, and the guards can be set as desired. When the screws are tightened, said parts are rigidly locked in the desired relative positions and are firmly held by the intermeshing notches or other locking means within the scope and spirit of my invention which might be employed as the equivalent of said notches. In practice when it is desired to adjust a part a screw can be loosened slightly, so that the notches will barely spring or slip past each other. I also attain material advantages by connecting or mounting the nose-pads in the manner described by flexible wires, as the wire arms or connections can be thus easily bent or looped to draw the nose-guards toward or from the plane occupied by the lenses to raise or lower said guards or to set the same at any desired angle. In the drawings I show a few of the many adjustments which can be obtained by means of said flexible arms, and the number of possible adjustments are increased by securing the flexible arms about at the centers of the lengths of the pads, as the pads can thereby be rocked on their centers, as is obvious to those skilled in the art.

It is evident that various changes might be made in the forms, constructions, and arrangements of the parts described without departing from the spirit and scope of my invention. Hence I do not wish to limit myself to the exact construction shown and described.

Having thus fully described my invention, what I claim as new, and desire to secure by Letters Patent of the United States, is—

1. In eyeglasses, the combination of the lenses having the studs, the spring having the end eyes seated against said studs, the nose-guards having connecting-arms provided with eyes seated against said spring-eyes, the clamping-screws passing through said eyes into the studs, said spring and guards being independently movable axially on said screws, said eyes and studs provided with locking means, substantially as described.

2. In combination, the lenses having the studs formed with notched ends, the spring having eyes formed with notched faces seated against said notched stud ends, the nose-guards having connecting-arms provided with end eyes seated against said spring-eyes and having corresponding notches, and the clamping pivot-screws passing through said eyes into the studs, substantially as described.

3. In eyeglasses, the combination of lens studs or supports, the connecting-spring, nose-guards having supporting-arms, and pivot clamping-screws locking said arms, spring and lens-supports together, said spring having eyes through which said screws pass, the parts being so constructed and arranged as to permit rocking of the spring independently of the lens-supports and nose-guards, when the screws are loosened, substantially as described.

In testimony whereof I affix my signature in presence of two witnesses.

POLK H. FLOWERS.

Witnesses:
 JOHN H. CLAGETT,
 W. V. FLOWERS.